April 18, 1939.  J. S. HARKER ET AL  2,154,844
CONVEYER CHAIN
Filed March 29, 1937   2 Sheets-Sheet 1
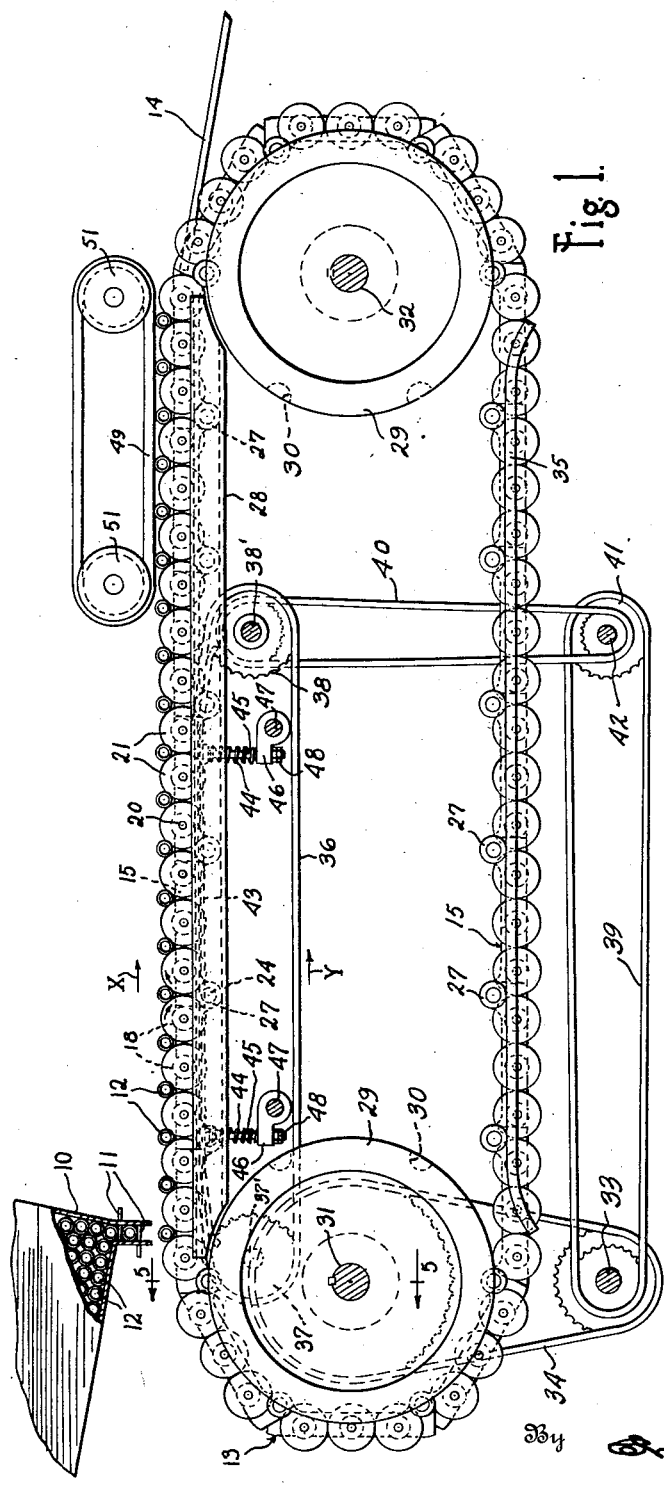
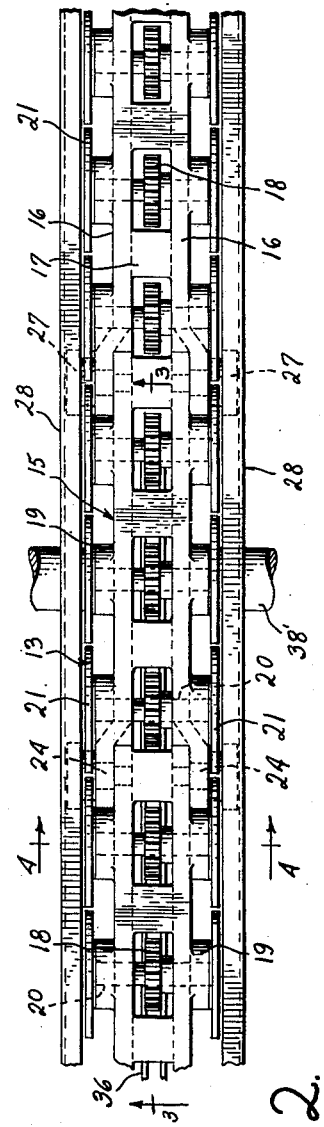
Inventors
John S. Harker
Leroy C. VanGorden
By
Attorney April 18, 1939.  J. S. HARKER ET AL  2,154,844
CONVEYER CHAIN
Filed March 29, 1937   2 Sheets-Sheet 2
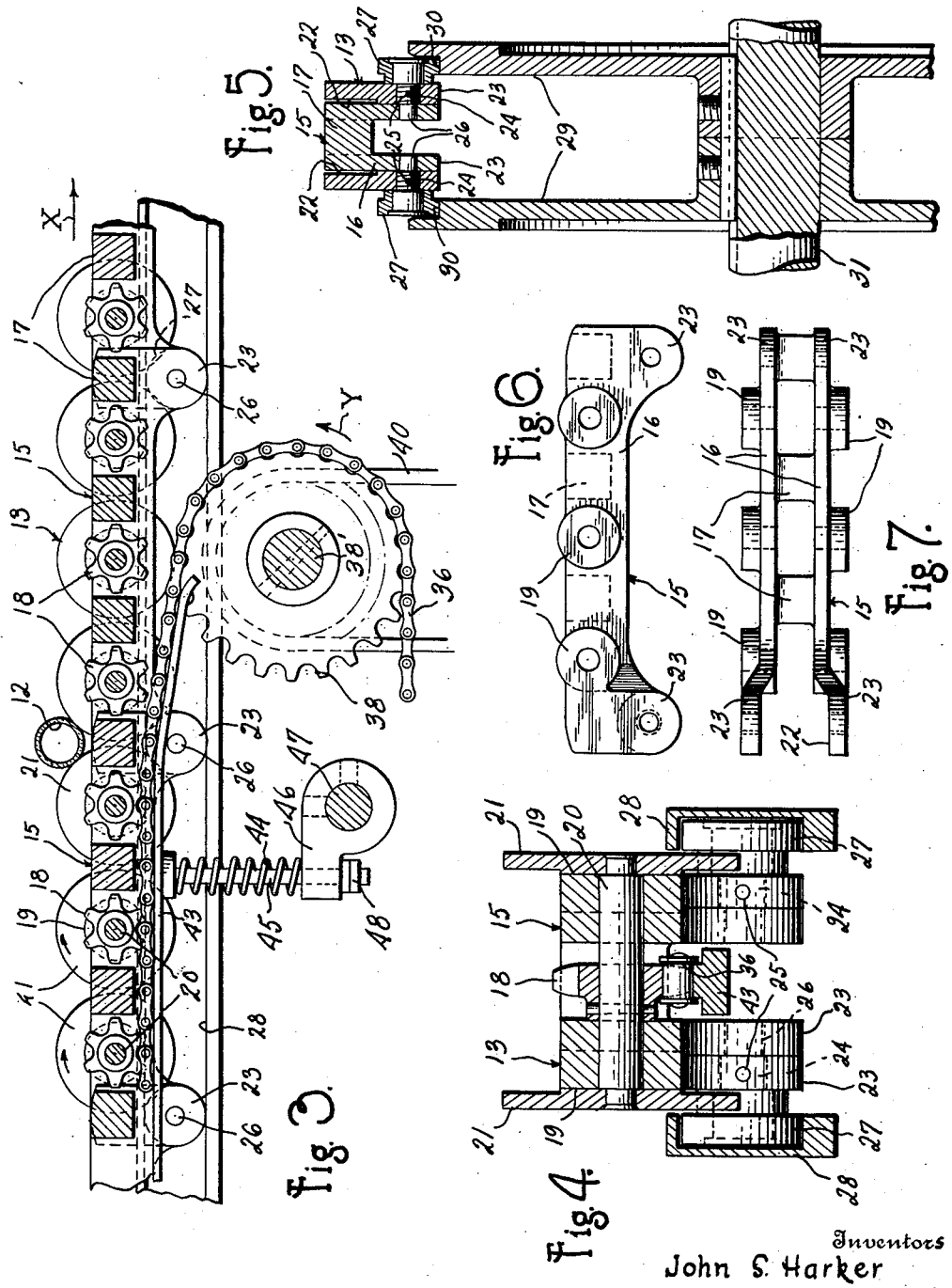
Inventors
John S. Harker
Leroy C. VanGorden
By Charles B. Belknap
Attorney Patented Apr. 18, 1939

2,154,844

UNITED STATES PATENT OFFICE 2,154,844

CONVEYER CHAIN

John S. Harker, Vineland, and Le Roy C. Van Gorden, Franklinville, N. J., assignors to Kimble Glass Company, Vineland, N. J., a corporation of Illinois Application March 29, 1937, Serial No. 133,704

3 Claims. (Cl. 198—183)

The present invention relates to a machine for shaping glass bodies, such as test tubes and vials, and more particularly to means for conveying and rotating the bodies while they move past processing stations and engage suitable shaping tools. Specifically, the invention provides apparatus in the form of a chain conveyer on which there are mounted for rotation a plurality of discs so spaced that pairs thereof support the glass body. Separate means are provided to rotate the discs, thus imparting rotation to the bodies supported thereon while they are being shaped. The invention further contemplates continuously moving the glass bodies so that they are shaped as they are conveyed through the machine.

It has previously been proposed to employ chain conveyers and discs of the type referred to herein, but difficulty has been experienced with sagging of the chain, lateral movement thereof due to chain and sprocket wear, and it has been difficult to impart the proper angular velocity to the discs while maintaining a desirable linear speed of chain travel.

It is, therefore, one of the objects of this invention to drive the chain and discs independently of each other so that rotation of the discs may be varied and controlled with respect to chain speed.

It is another object of the invention to provide suitable guides for the conveyer to prevent sagging and side sway thereof. The links of the conveyer are furthermore of considerable length and each link is adapted to rotatably support a plurality of discs aligned longitudinally of the chain.

It is still another object of the invention to connect the links in such a manner that quivering of the chain is avoided.

The invention will be more fully understood from the following description thereof taken in connection with the accompanying drawings, in which:

Fig. 1 is a side elevation of the conevyer, the side of the machine being removed for clearness;

Fig. 2 is a partial top plan view of the conveyer;

Fig. 3 is a sectional view taken on line 3—3 of Fig. 2;

Fig. 4 is a section taken through the chain on line 4—4 of Fig. 2;

Fig. 5 is a partial section through the travel roller and chain taken on line 5—5 of Fig. 1;

Fig. 6 is a side elevation of one of the chain links; and

Fig. 7 is a bottom plan view of the link shown in Fig. 6.

Referring to Fig. 1 of the drawings, there is shown a feed hopper 10 having gates 11 adapted to deposit glass tubes 12 at predetermined intervals on the conveyer designated generally by the numeral 13. The conveyer, moving in the direction of the arrow X, carries the tubes past several processing stations (not shown), which heat and shape certain portions of the tubes to bottom or neck them, or otherwise shape them. After shaping, the tubes are discharged from the conveyer onto an inclined chute shown at 14.

Referring now to Figs. 2 to 7, it will be seen that the conveyer chain is made up of a plurality of links 15, each of which comprises a pair of parallel side portions 16 connected by spaced bridges 17, there being openings between the bridges to accommodate sprockets 18. Each side portion of the link is provided with a plurality of bosses 19 bored to form bearings for the short shafts 20 to each of which is secured a sprocket 18 and, at the ends of the shaft, discs 21, as clearly shown in Fig. 4.

At one end of each link the side portions are spread, as at 22, to form furcations for accommodating one end of the next adjacent link. Also, each link has a depending portion 23 at each end thereof, the same being bored to accommodate stub shafts 24. Each shaft 24 is pinned to one link at 25, but has a reduced extension 26 fitting in the bore of the next link to form pivotal connections between the links. Furthermore, each of these stub shafts extends outwardly to form a journal for a roller 27. It is evident that the employment of relatively long links and the reduction of the number of connections therebetween results in a decrease of relative movement between the parts of the chain. This minimizes the tendency of the chain to stretch and contract.

As shown in Figs. 1, 2 and 3, there is disposed at each side of the conveyer 15 a horizontal channel-shaped rail 28 designed to act as a combined track and guide for rollers 27. These rails are parallel to each other and are spaced a distance apart slightly more than the distance between the outer faces of opposite rollers so that the conveyer has a very limited lateral movement. The tracks further support the chain to maintain the axes of the rollers in the same horizontal plane, thus inhibiting any sag in the chain. Hence, the glass tubes are conveyed through the machine in perfect alignment with the heaters and tools, insuring accuracy and uniformity of their ultimate shape. The upper flange of the track extends over the roller into proximity with the links of the conveyer so that broken glass is prevented from falling onto the track. In this way, irregularities and obstructions to the rollers are prevented from entering the channel which guides the rollers.

As stated hereinbefore, each link of the conveyer chain supports a plurality of discs, in the present embodiment six, three on each side of the link. The links are coupled directly to each other by accurate fitting pins or shafts, the result being that lost motion or play between links, as is usually the case when intermediate short links are used, is entirely eliminated and quivering of the chain avoided. A special type of travel roller or sprocket is employed to actuate the conveyer, these rollers, designated 29, being shown in Figs. 1 and 5. Each roller comprises an annular plate having on one of its faces a plurality of substantially semi-circular notches 30 so spaced that the rollers 27 journaled on the links accurately engage these notches. Rollers 29 are keyed to shafts 31, 32, one at each end of the machine, shaft 31 being driven from the main drive shaft 33 by means of a belt or other suitable means indicated at 34. As a further precaution against wear of the parts of the chain, a lower track 35 may be employed to support the chain and minimize stretching thereof.

It is the practice in shaping glass tubes, that is, in bottoming, necking and similar operations, where the shape is that of a surface of revolution, to rotate the tube as it engages the shaping tool. In the present machine this is accomplished by supporting the tubes on discs 21. It will be apparent from the drawings that the tube or other cylindrical body is supported adjacent each of its ends by a pair of juxtaposed discs rotating in the same direction and that rotation of these discs necessarily effects rotation of the tube. In the present arrangement, the sprockets 18 are engaged by a chain 36 moving in the direction indicated by the arrow Y. Chain 36 is driven by sprockets 37, 38 on shafts 37', 38', the latter in turn being driven from shaft 33 through belts or chains 39, 40 and the pulley or sprocket 41 on jack shaft 42. To insure accurate engagement of chain 36 with sprockets 18, a guide bar 43 is provided. This bar is yieldably supported by springs 44 each surrounding a rod 45 and bearing against arm 46, the latter being fixed on cross shafts 47 fixed with respect to the frame of the machine. The bar is adapted with this arrangement to be depressed sufficiently to permit accurate meshing of the spocket teeth with the chain. Adjustment of the compression of the spring is effected by nuts 48 on the threaded ends of rods 45.

It will be obvious that the angular velocity of discs 21 is not dependent on the linear speed of the conveyer, since the ratio of these velocities is readily varied by selecting sprockets or pulleys in the drive mechanism to obtain any ratio desired. It is also evident that the conveyer and discs are driven from a single main drive shaft as distinguished from those machines in which the conveyer is intermittently moved and the discs rotated while the conveyer is momentarily at rest. The length of chain 36 is such that the discs are rotated only during a portion of the conveyer travel, it being obvious that it is unnecessary to rotate the glass bodies except when they are being shaped.

There is shown above the conveyer a belt 49 on pulleys 51, 51. There are two of such belts, each inclined to the longitudinal path of movement of the conveyer, but oppositely with respect to each other. These belts also rotate the tubes and urge them transversely of the conveyer to hold the ends of the tubes in engagement with shapers or tools at the side of the machine.

While a specific embodiment of the conveyer has been illustrated, it is contemplated that certain changes be made therein without departing from the invention generally as expressed in the appended claims. The invention is, therefore, not limited to the particular arrangement of parts shown in the drawings, but is capable of being modified to meet particular requirements.

What we claim is:

1. In a machine of the class described, an endless conveyer, a plurality of spaced transverse shafts on said conveyer, a disc fast on each of said shafts at each end thereof, a sprocket on each of said shafts intermediate the discs thereon, a continuously moving chain engaging certain of said sprockets to rotate the discs, means for driving said chain, and means for driving said conveyer.

2. In a machine of the class described, an endless conveyer, a plurality of spaced transverse shafts on said conveyer, a disc fast on each of said shafts at each end thereof, a sprocket on each of said shafts intermediate the discs thereon, a continuously moving chain engaging certain of said sprockets to rotate the discs, a yieldably supported guide bar for maintaining said chain in engagement with said certain sprockets, means for driving said chain, and means for driving said conveyer.

3. In a machine of the class described, an endless conveyer comprising a plurality of relatively long links, each of said links having a bifurcated end, means for pivotally connecting said end with an end of an adjacent link, a roller carried by said connecting means, a track cooperating with said rollers, a plurality of spaced transverse shafts journaled in each of said links, a rotatable disc fast on each shaft at each end thereof, a sprocket on each shaft intermediate the discs thereon, a continuously moving chain for rotating said discs, and means for driving said conveyer.

JOHN S. HARKER.
LE ROY C. VAN GORDEN.